(No Model.)

V. H. BUSCHMANN.
DEVICE FOR OSCILLATING PHOTOGRAPHERS' DEVELOPING PANS.

No. 435,681. Patented Sept. 2, 1890.

WITNESSES:
Otto H. Ehlers.
John E. Morris.

INVENTOR:
V. H. Buschmann

BY Chas B. Mann
ATTORNEY.

UNITED STATES PATENT OFFICE.

VICTOR H. BUSCHMANN, OF BALTIMORE, MARYLAND.

DEVICE FOR OSCILLATING PHOTOGRAPHERS' DEVELOPING-PANS.

SPECIFICATION forming part of Letters Patent No. 435,681, dated September 2, 1890.

Application filed December 2, 1889. Serial No. 332,208. (No model.)

*To all whom it may concern:*

Be it known that I, VICTOR H. BUSCHMANN, a citizen of the United States, residing at Baltimore, in the State of Maryland, have invented certain new and useful Improvements in a Device for Oscillating Photographers' Developing-Pans, of which the following is a specification.

This invention relates to an improved device for oscillating photographers' developing-pans.

The invention is illustrated in the accompanying drawings, in which—

Figure 1:
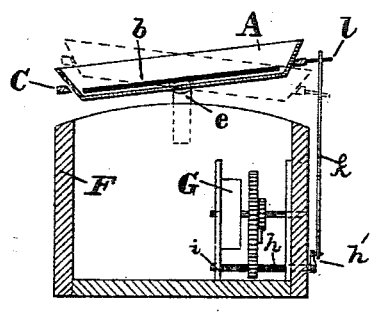
Figure 2:
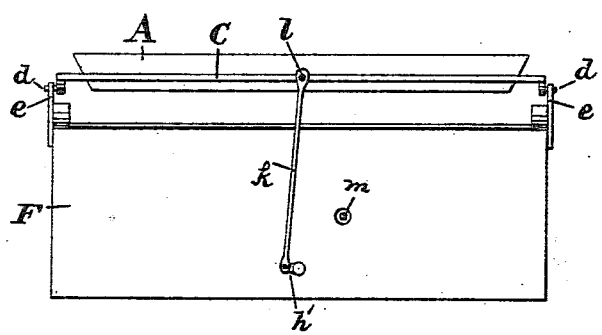
Figure 3:
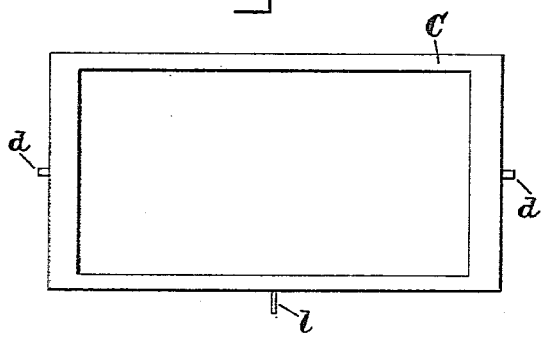
Figure 4:
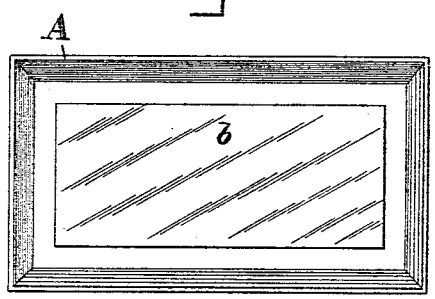

Figure 1 is a vertical cross-section of the developing-pan and oscillating device. Fig. 2 is a front elevation of the same. Fig. 3 is a top view of the pan-holder. Fig. 4 is a top view of the pan.

The developing-pan A is a shallow vessel of the usual form used by photographers. It is well understood that this pan is to contain the chemical solution or bath for the plate b, on which the picture is to be developed. The usual way is for the plate b to lie on the bottom of the pan in barely enough of the solution to cover the plate, and then for the operator to grasp the pan at opposite ends and to slowly rock or oscillate the pan sidewise, thereby causing the solution to flow back and forth from one side of the pan to the other, and each time to cover and uncover the plate.

The object of my invention is to produce this oscillating movement of the pan A by mechanical means. A suitable frame or holder C receives and supports the pan. At each end of the frame is a crank-arm d, which has a suitable bearing e, in which it is free to rock. These pivot-bearings e, which support the pan-holder, may be made in any desired form. They are attached to a case F, which incloses the mechanism of a motor G for driving a crank-shaft h, mounted in suitable bearings i. The motor here shown illustrates an ordinary spring-motor, such as are commonly used in clock or fly-fan mechanism, and being well known it is unnecessary to describe it here. A rod k connects the crank-arm h' with a pin l on the pivoted pan-holder, and thereby the revolution of the crank-shaft will cause an oscillation of the pan-holder and developing-pan.

The letter m designates the winding-arbor of the spring-motor. An ordinary key may be placed on this arbor and the spring wound.

Beside the convenience of the device and the fact that it leaves the operator's hands free to attend to other work while the developing is in progress, the motion given the pan is more uniform and regular and produces better results.

The motor or power for driving the device may be any other than a spring-motor.

It is obvious that a pan-holder may be long enough to hold more than one pan, so that one set of mechanism may work more than one pan.

Having described my invention, I claim—

The device herein described for oscillating photographers' developing-pans, consisting of the casing F, having bearings e at its ends, the pan A, mounted above the casing in a supporting frame or holder C, said frame having crank-arms d engaging said bearings, and the pin l at one side of the frame, having one end of a rod k connected thereto, the opposite end thereof being connected to an arm h' of a crank-shaft h of the motor mechanism, as shown and described.

In testimony whereof I affix my signature in the presence of two witnesses.

VICTOR H. BUSCHMANN.

Witnesses:
JOHN E. MORRIS,
JNO. T. MADDOX.